Feb. 25, 1936. L. A. JOHNSON 2,031,956
OIL RETAINER
Filed July 25, 1932
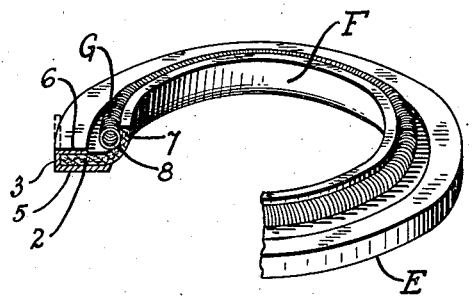
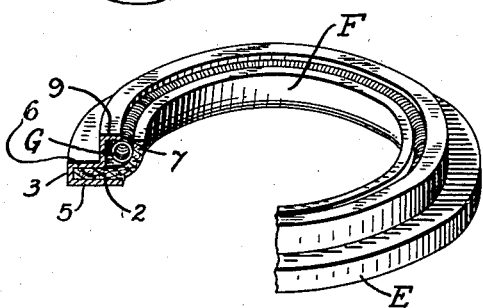
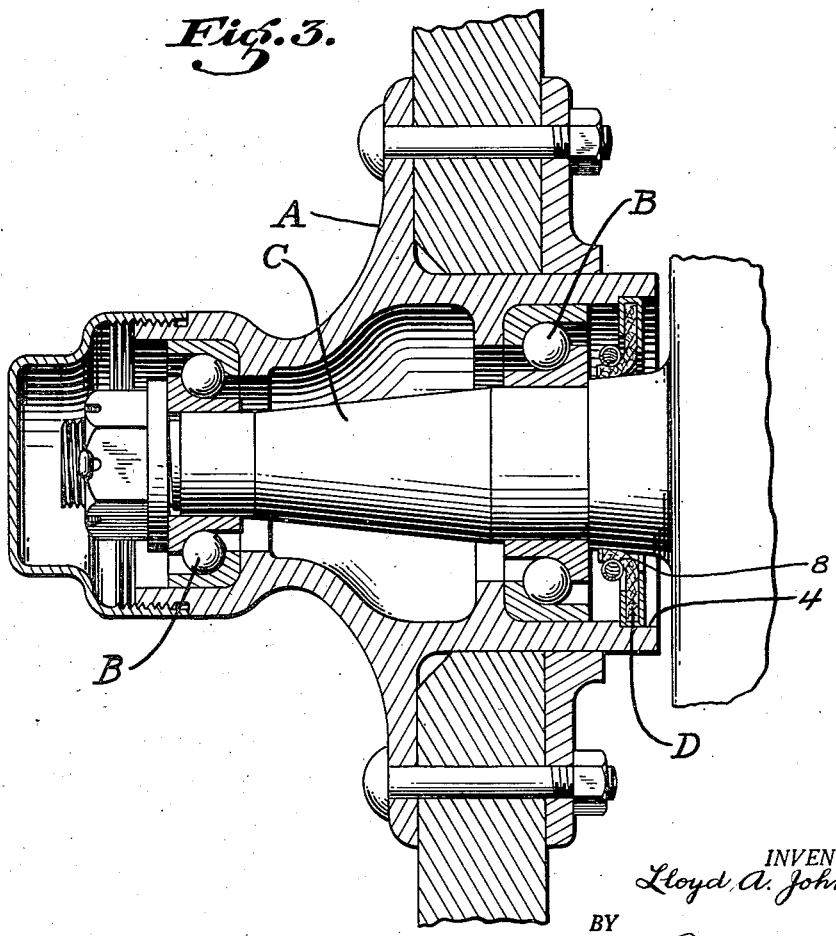
INVENTOR.
Lloyd A. Johnson.
BY Townsend & Loftus.
ATTORNEYS.

Patented Feb. 25, 1936

2,031,956

UNITED STATES PATENT OFFICE 2,031,956

OIL RETAINER

Lloyd A. Johnson, Hillsborough, Calif.

Application July 25, 1932, Serial No. 624,535

5 Claims. (Cl. 288—1)

This invention relates to packing devices commonly known as oil or grease retainers, and especially that type in which the packing member is carried by a ring-shaped metal cage, and the cage, together with the packing, is insertable as a unit within the housing of a bearing or the like.

Oil or grease retainers of this character are extensively used, particularly in the automotive industry, for instance, at the inner ends of the front and rear wheel bearings to prevent leakage of grease into the brake drums. They are also used in other parts where escape of grease or oil is undesirable and while many grease retainers serve the purpose intended their construction is complicated, too many parts are required, and manufacturing costs proportionately high.

The object of the present invention is to generally improve the construction and operation of grease or oil retainers of the character described; to simplify construction by reducing the number of parts employed to a minimum; to provide a single piece cage whereby the packing member is retained; and further, to simplify the means whereby the spring embracing the packing is held or retained in position.

The grease or oil retainer is shown by way of illustration in the accompanying drawing, in which—

Fig. 1 is a perspective view partially broken away and partially in section, showing one form of the grease or oil retainer.

Fig. 2 is a similar view showing a slight modification thereof.

Fig. 3 is a longitudinal sectional view of a front wheel assembly, showing the application of the grease or oil retainer.

Referring to the drawing in detail, and particularly Fig. 3, A indicates the hub or bearing housing of an automobile front wheel, B anti-friction bearings mounted within the housing, C the shaft or spindle upon which the hub and wheel is journaled, and D the grease retainer forming the subject matter of the present application. The grease retainer shown in Fig. 1 comprises a cage member E, a packing member F, and a contractile spring G. The cage is formed by punch and die operations from a suitable metal, such as sheet steel or the like. The cage, when first formed, is angle-shaped in cross section, as shown by dotted lines in Fig. 1. The packing member is then inserted and one flange of the cage is pressed or spun over to enclose and clamp the annular flange 2 of the packing.

The cage, when completed, is accordingly channel-shaped in cross section and thereby provides an outer peripheral wall 3 which forms a peripheral seal with relation to the inner surface 4 of the hub or bearing housing A, while the legs 5 and 6 of the channel-shaped cage form members whereby the annular flange 3 of the packing member is clamped and secured in a sealed manner.

The packing member F will in most instances be constructed of leather but may be constructed of other pliable materials. It comprises an annular flange portion 2 and an axially extending portion 7, which surrounds the shaft or spindle C, being held in sealed engagement therewith by the spring G.

The spring employed is an endless helical coiled ring-shaped spring which surrounds the axially extending portion of the packing. The spring is expanded when applied to the packing and as such exerts sufficient exterior pressure on the axially extending portion of the packing to maintain sealed engagement with the shaft or spindle.

Any suitable means may be provided for retaining the contractile spring G in position on the axially extending portion of the packing. For instance, in Fig. 1 it is accomplished by forming an annular groove 8 in the exterior surface of the packing. In Fig. 2, it is accomplished by forming an annular retaining flange 9 on the metal cage.

Fig. 2, which has been described as a modification of the structure shown in Fig. 1, is in reality identical thereto, the only difference being that the retaining flange 9 has been added. Fig. 1 shows the simplest form of the invention. It consists of only three members, to-wit, the packing member, the contracting spring, and the cage. The same is true of the structure shown in Fig. 2, as the retaining flange 9 is formed integral with the cage.

The structures shown are exceedingly simple in construction and as such are cheap to manufacture and easy to install. They form a perfect seal, both with relation to the bearing housing and the shaft extending thereto, and the axially extending portion is sufficiently flexible to take care of any misalignment between the housing and shaft. They may be pressed or driven into the housing and leakage around them is accordingly avoided, while leakage between the cage and the annular flange of the packing is avoided due to the clamping action of the legs or flanges of the cage.

The oil retainer disclosed in this application is particularly intended for new construction, i. e. for insertion in bearing housings especially designed for their reception. In such structures it is possible to materially reduce the overall length of the bearing housing, this being due to the narrowness or small space required by the metal cage. Again, it makes possible the installation of oil retainers in many instances where limitations in space prevented installation of different types of oil retainers now more or less commonly employed.

Having thus described my invention, what I claim and desire to secure by Letter Patent is—

1. An oil retainer comprising a pliable packing having an annular flange and an axially extending portion, a contractile member surrounding the axially extending portion, and a one-piece metal cage adapted to enclose and secure in a liquid tight joint the annular flange of said pliable packing member and also to provide a barrier to retain said contractile member on the axially extending portion of said packing member.

2. An oil retainer comprising a pliable packing having an annular flange and an axially extending portion, a contractile member surrounding the axially extending portion, and a one-piece metal cage providing a pair of annular grooves channel-shaped in cross section the one of larger diameter enclosing and securing in a liquid tight joint the annular flange of the packing, the other providing a housing over the axially extending portion of the packing to retain said contractile member on the latter.

3. An oil retainer comprising a pliable packing having an annular flange and an axially extending portion, a contractile member surrounding the axially extending portion, a one-piece twin channelled metal cage, one channel enclosing and securing the annular flange of the packing in a fluid tight joint, and the other channel retaining the contractile member against removal from the axially extending portion of the packing.

4. As an article of manufacture, a self contained seal for press fit insertion as an assembled unit within a housing in encompassing relation to a centrally located shaft, comprising a one-piece housing portion of generally circular conformation and unobstructed periphery for sliding press-fit with said housing having a channel-shaped space formed in one end thereof in spaced relation to the opposite end of said housing, a flexible circular packing of sheet material having an axially extending portion to encompass and engage with the shaft passing therethrough, and a clamping portion larger than the shaft-engaging portion and sealed within said channel, an inwardly extending and generaly radial flange at the end of said one-piece housing opposite to said channel, and resilient means for yieldably engaging the axially extending portion of the packing to cause the latter to engage and seal the shaft passing therethrough said flange serving to retain said resilient means on said packing.

5. As an article of manufacture, a self-contained seal for press fit insertion as an assembled unit within a housing in encompassing relation to a centrally located shaft comprising a one-piece cylindrical sheet metal cage having a smooth and unobstructed periphery for a sliding press fit engagement with the inside wall of the housing, a channel shaped clamping space of lesser diameter than said housing and formed in one end of said cage, and an integral inwardly extending and generally radial flange formed at the opposite end of said cage, a resilient packing member shaped to lie parallel with the shaft for a distance thereon and to extend from said shaft into said clamping space and a coil spring surrounding said packing member at its parallel portion, and held in place thereon by said aforementioned radial flange.

LLOYD A. JOHNSON.